United States Patent
Onggosanusi et al.

(10) Patent No.: US 9,059,824 B2
(45) Date of Patent: Jun. 16, 2015

(54) JOINT PROCESSING DOWN LINK COORDINATED MULTI-POINT REFERENCE SIGNAL SUPPORT

(75) Inventors: Eko N. Onggosanusi, Allen, TX (US); Zukang Shen, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 105 days.

(21) Appl. No.: 13/585,624

(22) Filed: Aug. 14, 2012

(65) Prior Publication Data
US 2014/0050201 A1 Feb. 20, 2014

Related U.S. Application Data

(63) Continuation of application No. 12/698,661, filed on Feb. 2, 2010, now Pat. No. 8,243,696.

(60) Provisional application No. 61/149,126, filed on Feb. 2, 2009.

(51) Int. Cl.
*H04L 5/00* (2006.01)
*H04B 7/02* (2006.01)

(52) U.S. Cl.
CPC .............. *H04L 5/0035* (2013.01); *H04B 7/024* (2013.01); *H04L 5/0048* (2013.01); *H04L 5/0073* (2013.01)

(58) Field of Classification Search
CPC ..... H04L 5/0035; H04L 5/0073; H04L 5/0048; H04B 7/024
USPC ................................................... 370/314, 336
See application file for complete search history.

(56) References Cited

U.S. PATENT DOCUMENTS

| | | | |
|---|---|---|---|
| 6,377,540 B1 * | 4/2002 | Hogberg et al. | 370/216 |
| 7,453,854 B2 * | 11/2008 | Fujishima et al. | 370/335 |
| 7,471,657 B2 * | 12/2008 | Blessent et al. | 370/335 |
| 7,486,637 B2 * | 2/2009 | Goldberg | 370/329 |
| 2010/0177746 A1 * | 7/2010 | Gorokhov et al. | 370/336 |
| 2012/0329400 A1 * | 12/2012 | Seo et al. | 455/63.1 |

* cited by examiner

*Primary Examiner* — Kwang B Yao
*Assistant Examiner* — Syed M Bokhari
(74) *Attorney, Agent, or Firm* — Ronald O. Neerings; Frank D. Cimino

(57) ABSTRACT

This invention concerns multiplexing in Long Term Evolution (LTE) and Long Term Evolution-Advanced (LTE-A) in Evolved Universal Terrestrial Radio Access Network (E-UTRAN) wireless telephony. Joint processing down link coordinated multi-point reference signaling includes combining resource signal types at a user equipment, determining conflicts between resource signals of plural user equipment, puncturing resource signals of other cell upon determining conflicts between resource signals of plural user equipment and transmitting non-punctured combined resource signals from a user equipment.

11 Claims, 2 Drawing Sheets

JOINT PROCESSING DOWN LINK COORDINATED MULTI-POINT REFERENCE SIGNAL SUPPORT

CLAIM OF PRIORITY

This application is a continuation of U.S. patent application Ser. No. 12/698,661 filed Feb. 2, 2010, now U.S. Pat. No. 8,243,696, which claims priority under 35 U.S.C. 119(e)(1) to U.S. Provisional Application No. 61/149,126 filed Feb. 2, 2009.

TECHNICAL FIELD OF THE INVENTION

The technical field of this invention is signaling in wireless telephony.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up link 111 time or frequency or code resources. If UE 109 has data ready for transmission, which may be traffic data, measurements report, tracking area update, UE 109 can transmit a random access signal on up link 111. The random access signal notifies base station 101 that UE 109 requires up link resources to transmit the UEs data. Base station 101 responds by transmitting to UE 109 via down link 110, a message containing the parameters of the resources allocated for UE 109 up link transmission along with a possible timing error correction. After receiving the resource allocation and a possible timing advance message transmitted on down link 110 by base station 101, UE 109 optionally adjusts its transmit timing and transmits the data on up link 111 employing the allotted resources during the prescribed time interval.

SUMMARY OF THE INVENTION

This invention concerns multiplexing in Long Term Evolution (LTE) and Long Term Evolution-Advanced (LTE-A) in Evolved Universal Terrestrial Radio Access Network (E-UTRAN) wireless telephony. Joint processing down link coordinated multi-point reference signaling includes combining reference signal types at a user equipment, determining conflicts between resource reference signals of plural user equipment, puncturing reference signals of other cell upon determining conflicts between reference signals of plural user equipment and transmitting non-punctured combined reference signals from a user equipment.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
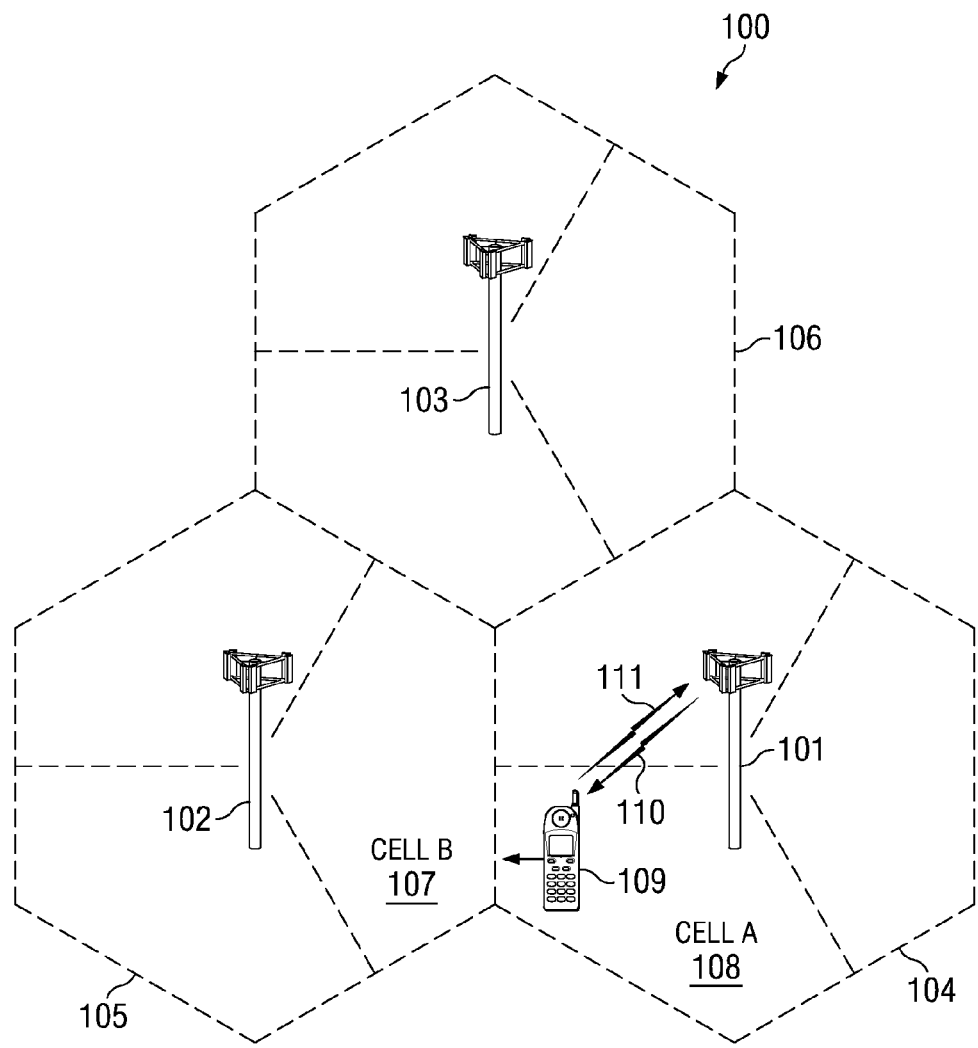
FIG. 1 is a diagram of a communication system of the prior art related to this invention having three cells.

This invention concerns multiplexing in Long Term Evolution (LTE) and Long Term Evolution-Advanced (LTE-A) in Evolved Universal Terrestrial Radio Access Network (E-UTRAN) wireless telephony. If we assume that the component carrier is configured to be E-UTRAN Rel. 8 (R8) compatible, then in all subframes R8 cell-specific reference signals (CRS) for antenna ports 0 to 3 shall be present for at least in the first 2 Orthogonal Frequency Division Multiplexing (OFDM) symbols (the first slot). Additionally, the system will be used for R8 channel estimation, measurements, etc. Under these conditions all LTE-A UEs are assumed to be configured for down link (DL) joint processing (JP) coordinated multi-point (COMP) transmission.

Multiplexing between LTE and LTE-A UEs for R8-compatible carrier require the following. For Frequency Division Multiplexing (FDM) LTE and LTE-A transmission are allowed to co-exist in a subframe. LTE-A UEs are allocated a set of Radio Bearers (RBs). LTE-A specific features should be transparent to LTE UEs. For Time Division Multiplexing (TDM) there can be LTE-only subframes and LTE-A-only subframes. LTE and LTE-A transmissions cannot co-exist within a single subframe. This separation is supported by subframe identification. LTE-A-only subframes appear as Multimedia Broadcast Multicast Service Single Frequency Network (MBSFN) subframes to R8 UEs. Thus this multiplexing includes three types of subframes: LTE-only subframes; LTE-A-only subframes; and mixed subframes.

There are several types of DL Reference Signals (RS) for COMP. Assume that DL COMP has up to 4 transmitting antennas per cell. There are three categories of DL RS for COMP. The first category is Channel Quality Indicator (CQI) RS including measurement and CQI/Precoding Matrix Indicator (PMI)/Rank Indicator (RI) computation. These are cell-specific, wideband and non-precoded. The second category is Demod-RS for DL control including channel estimation for DL control demodulation such as Physical Control Format Indicator CHannel (PCFICH), Physical Hybrid Automatic Repeat Request (ARQ) Indicator CHannel (PHICH) and Physical Downlink Control CHannel (PDCCH). These are cell-specific and wideband because DL control spans the entire component carrier bandwidth. This case can simply reuse the R8 CRS and DL control transmission mechanism. The third category is Demod-RS for Physical Downlink Shared CHannel (PDSCH) including channel estimation for data demodulation. A first alternative in this category uses R8 CRS in the first and second slots, and is wideband and non-precoded. A second alternative in this category uses additional UE-specific RS (URS) only in scheduled RB(s) and is precoded.

For JP DL COMP there are two types of combining at the UE. The first type of combining is coherent combining including symbol-level combining before equalization and demodulation. The second type of combining is non-coherent combining including soft bit (LLR) combining after equalization/demodulation, preferably before FEC decoding which is analogous to Hybrid Automatic Repeat Request (HARQ) combining. This is an implementation issue, but it affects the signaling support design for DL COMP. Table 1 compares various aspects of coherent and non-coherent combining.

TABLE 1

| Aspect | Coherent combining | Non-coherent combining |
|---|---|---|
| Active set awareness/ knowledge | Depending on the demod-RS PDSCH type: R8 CRS is required, URS may not be required | Decoding is required to be done cell-by-cell R8 CRS is more suitable |
| CQI/PMI/RI reporting | Typically suited with joint reporting | Disjoint reporting |
| Transmission from multiple points | Identical signal System Frame Number (SFN) combining gain must be in the same set of resource elements (REs) with the same Modulation and Coding Scheme (MCS) | Identical SFNs can be from different sets of REs or different MCSs |
| PDSCH REs and CRS location | Potential conflict between PDSCH REs and CRS location among cells in the active COMP set due to frequency shift | No conflict |

The level of conflict for coherent combining depends on the following: whether using LTE or LTE-A COMP configured multiplexing in TDM or FDM; the type of demod-RS for PDSCH; and the DL control length.

Table 2 list the parameters of JP COMP RE conflict for coherent combining.

TABLE 2

| | TDM for COMP capable transmission | FDM (Mixed) |
|---|---|---|
| PDSCH demod-RS with R8 CRS PDSCH demod-RS with new URS | Opt 1: conflict in 4 symbols per subframe Opt 2: No conflict | Opt 3 (R8 CRS) and Opt 4 (URS) for: n = 1: conflict in 5 symbols per subframe n > 1: conflict in 4 symbols per subframe |

In the second column, the TDM for COMP capable transmission includes UEs with 1-cell active set. In the third column, n is the length of DL control region in OFDM symbols. In Table 2 MBSFN subframes (TDM) for 4 transmitting antennas always use 2-symbol DL control.

There are two basic solutions when conflict occurs. The first solution ignores inter-cell CRS interference. This creates interference and rate matching error which is risky. In the second solution RE punctures on CRS locations in other cells. This causes increased overhead but is preferred. For 4 transmitting antennas and 2-symbol DL control and normal Cyclic Prefix (CP), the CRS overhead increases from 11% to 33%. Puncturing can be tailored to the active COMP set, for example dependent on the cell IDs of the member cells, to reduce overhead. This does increase the number of options.

Assuming using the second solution when conflict occurs, all options noted in Table 2 incur overhead. For options Opt1 and Opt3 this overhead is RE puncturing in PDSCH. For option Opt2 this overhead is a new URS. For option Opt4 this overhead is a combination of RE puncturing and new URS. This option is not preferred. It is expected that that option Opt2 incurs less overhead than options Opt1 and Opt3. In option Opt2 the URS overhead depends on the number of layers and can be designed more efficiently. In addition in option Opt2 the same URS frequency shift is used across cells within the active COMP set.

The following notes the parameters of the preferred setup according to this invention. Note that coherent combining with TDM transmission is preferred as it is believed to be the cleanest setup. For coherent combining and TDM for COMP transmission PDSCH RE puncturing is not required. Thus the UE is not required to be aware of active COMP set. In this case UE-specific RS, which is identical for all members of active COMP cell and has same frequency shift for all cells in active set, is used for PDSCH demod-RS. For coherent combining and FDM transmission PDSCH RE puncturing is required to avoid CRS interference. The UE may be required to be aware of active COMP set depending on the PDSCH RE puncturing scheme. Reuse of R8 cell-specific RS for PDSCH demod-RS seems more suitable in terms of overhead. TPMI is required for DL grant. For non-coherent combining PDSCH RE puncturing is required to avoid CRS interference. The UE must be aware of active COMP set. For non-coherent combining and TDM transmission either reusing R8 CRS or UE-specific RS with cell-specific frequency shift is reasonable. For non-coherent combining and FDM transmission reuse of R8 cell-specific RS for PDSCH demod-RS seems more suitable in terms of overhead.

UE awareness of active COMP set for coherent combining with FDM does not require fixed RE puncturing corresponding to the other 2 CRS frequency shifts. This awareness can be made UE-specific for only UEs configured for COMP or cell-specific. Active-set-dependent RE puncturing corresponding to the interfering CRS frequency shifts only is required and must be UE specific.

Generally the active COMP set can be cell-specific or UE-specific. If cell-specific some UEs are configured for COMP with the same active set and some are not. If UE-specific the members of the active COMP set are UE-specific.

Figure 2:
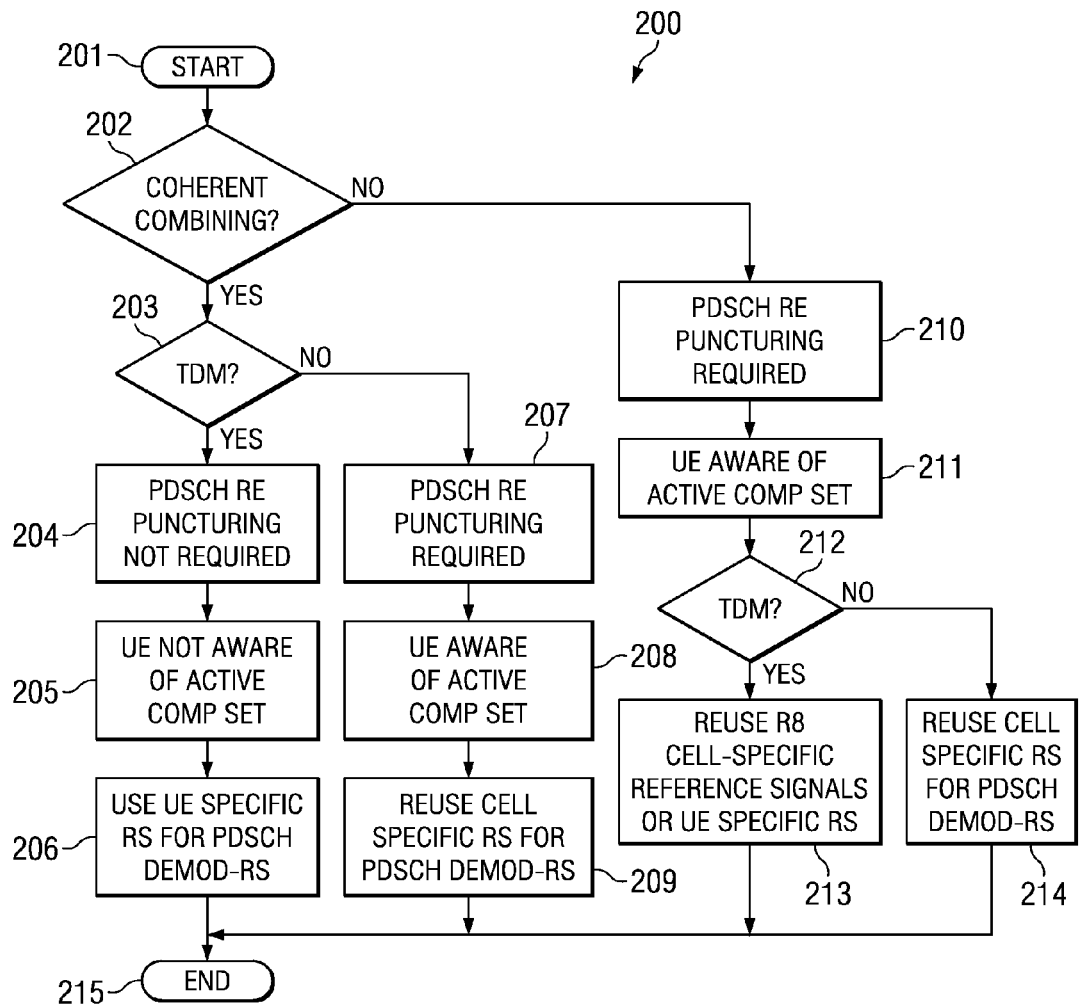
FIG. 2 is a flow chart illustrating the decision path of this invention.

FIG. 2 is a flow chart 200 illustrating the decision path of this invention. Flow chart 200 begins with start block 201. Test block 202 determines whether coherent combining is selected. If coherent combining is selected (Yes at test block 202), then test block 203 determines if Time Division Multiplexing is selected. If Time Division Multiplexing is selected (Yes at test block 203), then in block 204 PDSCH RE puncturing is not required, in block 205 the UE need not be aware of the COMP set and in block 206 the transmission uses a UE specific RS for PDSCH demod-RS. Flow chart 200 then ends at end block 215. If Frequency Division Multiplexing is selected (No at test block 203), then in block 207 PDSCH RE puncturing is required, in block 208 the UE must be aware of the COMP set and in block 208 the transmission reuses a Cell specific RS for PDSCH demod-RS. Flow chart 200 then ends at end block 215.

If non-coherent combining is selected (No at test block 202), then in block 210 PDSCH RE puncturing is required and in block 211 the UE must be aware of the COMP set. Test block 212 determines if Time Division Multiplexing is selected. If Time Division Multiplexing is selected (Yes at test block 212), then in block 213 the transmission uses an R8 cell-specific reference signal of or a UE specific RS. Flow chart 200 then ends at end block 215. If Frequency Division Multiplexing is selected (No at test block 212), then in block 214 the transmission reuses a Cell specific RS for PDSCH demod-RS. Flow chart 200 then ends at end block 215.

What is claimed is:

1. A method of processing down link coordinated multi-point reference signaling in a user equipment (UE), comprising: determining if coherent combining is selected for processing down link coordinated multi-point (COMP) reference signaling; determining if Time Division Multiplexing is selected when coherent combining is selected; avoiding Physical Downlink Shared Channel (PDSCH) resource element puncturing when Time Division Multiplexing is selected; avoiding making the UE aware of an active coordinated multi-point set when Time Division Multiplexing is selected; and using a user equipment specific reference signal for Physical Downlink Shared Channel (PDSCH) demod-RS when Time Division Multiplexing is selected.

2. The method of claim 1, further comprising:
performing Physical Downlink Shared Channel (PDSCH) resource element puncturing when Time Division Multiplexing is not selected;
making the UE aware of an active coordinated multi-point set when Time Division Multiplexing is not selected;
determining if Time Division Multiplexing is selected when coherent combining is selected; and
reusing a cell specific reference signal for Physical Downlink Shared Channel (PDSCH) demod-RS when Time Division Multiplexing is not selected.

3. The method of claim 1, further comprising:
performing Physical Downlink Shared Channel (PDSCH) resource element puncturing when coherent combining is not selected;
making the UE aware of an active coordinated multi-point set when coherent combining is not selected;
determining if Time Division Multiplexing is selected when coherent combining is selected; and
reusing an R8 cell specific reference signal of a UE specific reference signal for Physical Downlink Shared Channel (PDSCH) demod-RS when Time Division Multiplexing is selected.

4. The method of claim 2, further comprising:
performing Physical Downlink Shared Channel (PDSCH) resource element puncturing when coherent combining is not selected;
making the UE aware of an active coordinated multi-point set when coherent combining is not selected;
determining if Time Division Multiplexing is selected when coherent combining is selected; and
reusing an R8 cell specific reference signal of a UE specific reference signal for Physical Downlink Shared Channel (PDSCH) demod-RS when Time Division Multiplexing is selected.

5. The method of claim 1, further comprising:
performing Physical Downlink Shared Channel (PDSCH) resource element puncturing when coherent combining is not selected;
making the UE aware of an active coordinated multi-point set when coherent combining is not selected;
determining if Time Division Multiplexing is selected when coherent combining is selected; and
reusing a cell specific reference signal for Physical Downlink Shared Channel (PDSCH) demod-RS when Time Division Multiplexing is selected.

6. The method of claim 2, further comprising;
performing Physical Downlink Shared Channel (PDSCH) resource element puncturing when coherent combining is not selected;
making the UE aware of an active coordinated multi-point set when coherent combining is not selected;
determining if Time Division Multiplexing is selected when coherent combining is selected; and
reusing a cell specific reference signal for Physical Downlink Shared Channel (PDSCH) demod-RS when Time Division Multiplexing is selected.

7. The method of claim 1, further comprising:
performing Physical Downlink Shared Channel (PDSCH) resource element puncturing when coherent combining is not selected;
making the UE aware of an active coordinated multi-point set when coherent combining is not selected;
determining if Time Division Multiplexing is selected when coherent combining is selected;
reusing an R8 cell specific reference signal of a UE specific reference signal for Physical Downlink Shared Channel (PDSCH) demod-RS when Time Division Multiplexing is selected; and
reusing a cell specific reference signal for Physical Downlink Shared Channel (PDSCH) demod-RS when Time Division Multiplexing is selected.

8. The method of claim 2, further comprising:
performing Physical Downlink Shared Channel (PDSCH) resource element puncturing when coherent combining is not selected;
making the UE aware of an active coordinated multi-point set when coherent combining is not selected;
determining if Time Division Multiplexing is selected when coherent combining is selected;
reusing an R8 cell specific reference signal of a UE specific reference signal for Physical Downlink Shared Channel (PDSCH) demod-RS when Time Division Multiplexing is selected; and
reusing a cell specific reference signal for Physical Downlink Shared Channel (PDSCH) demod-RS when Time Division Multiplexing is selected.

9. A method of processing down link coordinated multi-point reference signaling in a user equipment (UE), comprising: determining if coherent combining is selected for processing down link coordinated multi-point (COMP) reference signaling; determining if Time Division Multiplexing is selected when coherent combining is selected; performing Physical Downlink Shared Channel (PDSCH) resource element puncturing when Time Division Multiplexing is not selected; making the UE aware of an active coordinated multi-point set when Time Division Multiplexing is not selected; and reusing a cell specific reference signal for Physical Downlink Shared Channel (PDSCH) demod-RS when Time Divison Multiplexing is not selected.

10. A method of processing down link coordinated multi-point reference signaling in a user equipment (UE), comprising: determining if coherent combining is selected for processing down link coordinated multi-point (COMP) reference signaling; performing Physical Downlink Shared Channel (PDSCH) resource element puncturing when Time Division Multiplexing is not selected; making the UE aware of an active coordinated multi-point set when Time Division Multiplexing is not selected; determining if Time Division Multiplexing is selected when coherent combining is selected; and reusing a cell specific reference signal for Physical Downlink Shared Channel (PDSCH) demod-RS when Time Divison Multiplexing is not selected.

11. A method of processing down link coordinated multi-point reference signaling in a user equipment (UE), comprising: determining if coherent combining is selected for processing down link coordinated multi-point (COMP) reference signaling; performing Physical Downlink Shared Channel (PDSCH) resource element puncturing when Time Division Multiplexing is not selected; making the UE aware of an active coordinated multi-point set when Time Division Multiplexing is not selected; determining if Time Division Multiplexing is selected when coherent combining is selected; and reusing an R8 cell specific reference signal of a UE specific reference signal for Physical Downlink Shared Channel (PDSCH) demod-RS when Time Division Multiplexing is selected.

\* \* \* \* \*